United States Patent
Zhang et al.

(10) Patent No.: US 10,318,468 B2
(45) Date of Patent: Jun. 11, 2019

(54) FPGA-BASED INTERFACE SIGNAL REMAPPING METHOD

(71) Applicant: State Nuclear Power Automation System Engineering Co., Ltd., Shanghai (CN)

(72) Inventors: Jian Zhang, Shanghai (CN); Qunxing Jiang, Shanghai (CN); Xiaokai Wang, Shanghai (CN)

(73) Assignee: STATE NUCLEAR POWER AUTOMATION SYSTEM ENGINEERING CO., LTD., Shanghai (CN)

( * ) Notice: Subject to any disclaimer, the term of this patent is extended or adjusted under 35 U.S.C. 154(b) by 0 days.

(21) Appl. No.: 15/565,870

(22) PCT Filed: Jan. 4, 2016

(86) PCT No.: PCT/CN2016/000002
§ 371 (c)(1),
(2) Date: Oct. 11, 2017

(87) PCT Pub. No.: WO2017/016178
PCT Pub. Date: Feb. 2, 2017

(65) Prior Publication Data
US 2018/0107622 A1    Apr. 19, 2018

(30) Foreign Application Priority Data
Jul. 29, 2015  (CN) .......................... 2015 1 0455979

(51) Int. Cl.
*H03K 19/17*    (2006.01)
*G06F 13/42*    (2006.01)
(Continued)

(52) U.S. Cl.
CPC ............ *G06F 13/4239* (2013.01); *G06F 1/12* (2013.01); *G06F 1/24* (2013.01); *G06F 5/14* (2013.01);
(Continued)

(58) Field of Classification Search
CPC .................... H03K 19/1774; H03K 19/17744
See application file for complete search history.

(56) References Cited

U.S. PATENT DOCUMENTS

| | | | |
|---|---|---|---|
| 2003/0112031 A1* | 6/2003 | Agrawal | H03K 19/17744 326/41 |
| 2006/0233172 A1* | 10/2006 | Venkata | H03K 19/17744 370/391 |
| 2007/0283052 A1* | 12/2007 | Wojewoda | H03K 19/1732 710/2 |

* cited by examiner

*Primary Examiner* — Albert Wang
(74) *Attorney, Agent, or Firm* — Houtteman Law LLC

(57) ABSTRACT

An FPGA-based interface signal remapping method, relates to the technical field of nuclear power system, and solves the technical problems of poor reliability, readability and debuggability in the prior art. The method comprises dividing an internal programmable logic of an FPGA chip into two independent modules, with one module being an I/O module and the other module being a Core module, using the I/O module to process signal excursion occurring when an external signal is input to or output from the FPGA chip, signal collision caused by line multiplexing, metastable state in a data transmission process, and a data transmission error between asynchronous clock domains, using the Core module to implement logical processing and computing; and introducing a master clock signal outside the FPGA chip into the FPGA chip through a global clock pin of the FPGA chip. The method provided in the invention is suitable for a nuclear power protection system platform.

2 Claims, 3 Drawing Sheets

(51) Int. Cl.
*G06F 13/40* (2006.01)
*G06F 1/12* (2006.01)
*G06F 1/24* (2006.01)
*G06F 5/14* (2006.01)
(52) U.S. Cl.
CPC ........ G06F 13/40 (2013.01); *G06F 2205/126* (2013.01)

FPGA-BASED INTERFACE SIGNAL REMAPPING METHOD

FIELD OF THE INVENTION

The present invention relates to a nuclear power system technology, in particular to a technology of FPGA-based interface signal remapping method.

DESCRIPTION OF THE RELATED ART

FPGA technology has the advantages of regular structure and high reliability, and the FPGA technology is increasingly used in the field of instrumentation and control system to achieve a variety of functions, including communication protocols as well as logical processing and control. When using an FPGA chip, it is necessary to input the external signal into the chip for processing. Some problems may occur in the process, including the master clock signal excursion, data collision due to two-way data signal input/output through a single signal line, metastable register output due to asynchronous reset signal, transmission rate error of data signals between asynchronous clock domains, and poor readability of signal name in the FPGA chip.

For transmission of two-way data signals, Chinese patent No. CN101833431A discloses a two-way high-speed FIFO memory implemented based on FPGA. The two-way high-speed FIFO memory comprises a first asynchronous bus interface module, a first communication mailbox, a first one-way asynchronous FIFO read-write module, a second asynchronous bus interface module, a second communication mailbox and a second one-way asynchronous FIFO read-write module; and the memory is capable of achieving the programmable logic output line width, synchronous or asynchronous input and output clock, and two-way mailbox communication function. The memory realizing the two-way FIFO based on FPGA has the advantages of stabilization, fast speed, easy implementation and less resource occupation. Meanwhile, the memory is easy to integrate with other logic functions to effectively improve the system integration, reduce the system size and reduce power consumption. In addition, according to a document titled Research on Two-Way (I/O) Port in FPGA, the design of two-way port I/O in FPGA is studied based on the characteristics of field programmable gate array (FPGA) chip, and a method for simulation initialization of a two-way port I/O is provided. By adopting the method of two-way port design, a multi-channel image signal processing system is designed based on the Spartan2E chip of Xilinx.

For transmission of data signals between asynchronous clock domains, Chinese patent application No. 201010547869.X discloses an FPGA-based single-interrupt real-time data transmission method. According to the method, the data from multiple asynchronous data sources are cached in an FPGA-based single-interrupt data transmission device, and then sent to an upper computer. The method belongs to the real-time signal processing field. The method is that firstly selecting an appropriate interrupt cycle according to the conditional inequality of data transmission without data loss, then creating data buffers in the FPGA and creating the write state registers for all data buffers respectively, then generating a periodic interrupt signal according to half-full and full signals generated by the buffers, and triggering an interrupt service routine by responding to the periodic signal by the upper machine, thus achieving the real-time continuous transmission. Compared to the trigger mode with multi-interrupt sources, the method reduces the complexity of hardware and software programming and debugging, and improves the system reliability. Because of the relatively stable data size generated by every interrupt, it is relatively convenient for centralized bulk transmission and post-processing of data.

For processing of global reset signal of FPGA chip, Chinese patent publication No. CN201805409U discloses a reset circuit of an FPGA system, which realizes the reliable reset of the system and improves the stability of the system after reset. The circuit comprises a reset chip and reset branches connected with manual reset pins of the reset chip. The reset branches generate low level signals, so as to control the reset chip to generate a low level signal as the system reset signal.

However, for design of FPGA in the nuclear power instrumentation and control system in the prior art, the master clock signal transmission, two-way data transmission and signal transmission, data transmission between asynchronous clock domains, asynchronous reset signal transmission and mapping of different signal names are located in different functional modules and have poor readability and debuggability, which are not conducive to the modular design and debugging of FPGA. Moreover, there is no technology available for nuclear power protection system platform that is capable of reliably transmitting all external signals into the FPGA chip in the protection system platform. It is in urgent need to solve these problems in a functional module for research and development of an FPGA-based protection system platform, so that the logic module in the FPGA can focus on execution of communication, arithmetic operation, logical processing and other functions with improved reliability, readability and debuggability.

SUMMARY OF THE INVENTION

To solve the defects in the prior art, the technical problem to be solved by the invention is to provide an FPGA-based interface signal remapping method capable of reliably transmitting external signals into an FPGA chip, so that a logic module in the FPGA can focus on execution of communication, arithmetical operation, logical processing and other functions with improved reliability, readability and debuggability.

In order to solve the technical problem, the invention provides an FPGA-based interface signal remapping method, characterized by:

dividing an internal programmable logic of an FPGA chip into two independent modules, with one module being an I/O module and the other module being a Core module, using the I/O module to process signal excursion occurring when an external signal is input to or output from the FPGA chip, signal collision caused by line multiplexing, metastable state in a data transmission process, and a data transmission error between asynchronous clock domains; using the Core module to implement logical processing and computing; and introducing a master clock signal outside the FPGA chip into the FPGA chip through a global clock pin of the FPGA chip;

wherein, the I/O module comprises a tri-state gate circuit and asynchronous FIFOs;

the Core module transmits two-way data signals with peripheral components by using the tri-state gate circuit of the I/O module; and Data signals from the asynchronous clock domains outside the FPGA chip are cached in the asynchronous FIFOs through the I/O module and then input into the Core module.

Furthermore, the I/O module comprises a first-level register and a second-level register.

A global asynchronous reset signal outside the FPGA chip is accessed to a set port of the first-level register in the I/O module, a constant "0" is input into the first-level register, the output of the first-level register is input into the second-level register, and then the output of the second-level register is taken as a sampled global reset signal to reset other registers in the FPGA chip.

According to the FPGA-based interface signal remapping method provided in the invention, the I/O module is used to process the signal excursion occurring when an external signal is input to or output from the FPGA chip, signal collision caused by line multiplexing, metastable state in a data transmission process, and a data transmission error between asynchronous clock domains; and the Core module is used to implement logical processing and computing; and introduce a master clock signal outside the FPGA chip into the FPGA chip through a global clock pin of the FPGA chip, so as to prevent and alleviate such problems as master clock signal excursion, data signal collision in a single signal line, metastable register output due to asynchronous reset signal, transmission rate error of data signals between asynchronous clock domains, and poor readability of signal name in the FPGA chip. Thus, the Core module can focus on execution of communication, arithmetical operation, logical processing and other functions with improved reliability, readability and debuggability.

DESCRIPTION OF THE PREFERRED EMBODIMENT

The embodiment of the invention is described in detail in combination with description of accompanying drawings. However, the embodiment is not used to limit the invention. Any structures and changes similar to the invention should be incorporated in the protection scope of the invention. All caesura signs in the invention refer to "and".

Figure 1:
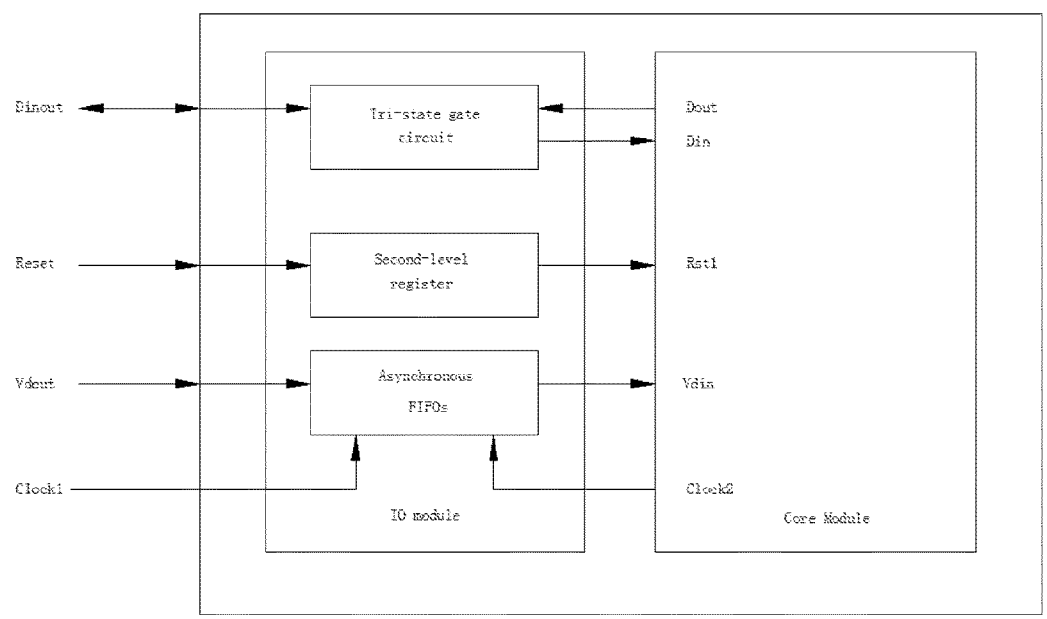
FIG. 1 is a schematic diagram of the FPGA-based interface signal remapping method of the embodiment of the invention.
Figure 2:
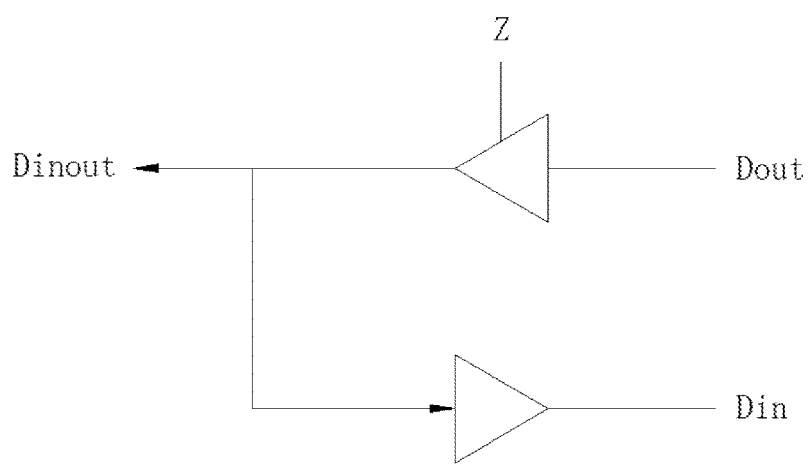
FIG. 2 is a schematic diagram of two-way data signal transmission using the tri-state gate circuit in the FPGA-based interface signal remapping method of the embodiment of the invention.
Figure 3:
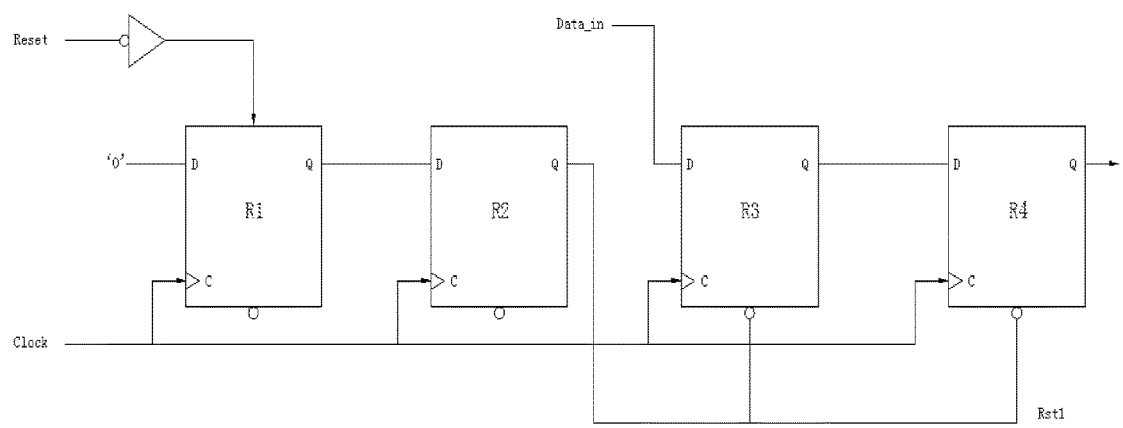
FIG. 3 is a schematic diagram of sampling an asynchronous reset signal using the first-level register and second-level register in the FPGA-based interface signal remapping method of the embodiment of the invention.

FIG. 1 shows an FPGA-based interface signal remapping method of the embodiment of the invention, characterized by:

dividing an internal programmable logic of an FPGA chip into two independent modules, with one module being an I/O module and the other module being a Core module, using the I/O module to process the signal excursion occurring when an external signal is input to or output from the FPGA chip, signal collision caused by line multiplexing, metastable state in a data transmission process, and a data transmission error between asynchronous clock domains; using the Core module to implement logical processing and computing; and introducing a master clock signal outside the FPGA chip into the FPGA chip through a global clock pin of the FPGA chip, so as to alleviate the clock signal excursion caused by signal output overload of the master clock;

wherein, the I/O module comprises a tri-state gate circuit, asynchronous FIFOs, a first-level register and a second-level register;

The Core module transmits two-way data signals with the peripheral components by using the tri-state gate circuit of the I/O module to prevent the signal collision caused by input/output multiplexing of data line; as shown in FIG. 2, Dinout is a signal line for two-way data transmission outside the FPGA chip, Dout is a data output signal line of the Core module, Din is a data input signal line of the Core module, and Z is a signal line used to control the output state of the tri-state gate circuit; when Z=1, the tri-state gate circuit is set in a high-impedance state, the data can only be input to the Din signal line from the Dinout signal line, and the Dinout signal line is the input port; when Z=0, the tri-state gate circuit is on state, the data are input to the Dinout two-way signal line from the Dout signal line, and the Dinout signal line is the output port, so as to control the two-way data transmission between the Core module and the Dinout signal line by adjusting the level of the Z signal line;

Data signals from the asynchronous clock domains outside the FPGA chip are cached in the asynchronous FIFOs through the I/O module and then input into the Core module to prevent the data loss caused by mismatching between clock signals from both clock domains; as shown in the embodiment of the invention, bit width and depth of the asynchronous FIFOs in the I/O module are 8 and 4 respectively; the asynchronous FIFO refers to independent read clock and write clock; as shown in FIG. 1, an input data signal (Vdout) of the asynchronous FIFO is controlled by a write data clock (Clock1), and an output data signal (Vdin) of the asynchronous FIFO is controlled by a read data clock (Clock2), the Vdout is a signal outside FPGA chip, and the Vdin is a signal input into the Core module from the Vdout; the asynchronous FIFO mainly serves to cache data and isolate clock discrepancies or phase difference in the design of FPGA; the asynchronous FIFOs can be accessed by using the data line and read-write control signal line rather than address line; an internal read-write pointer can automatically add 1 or subtract 1 to change the data address; thus, the data can be cached in the asynchronous FIFOs through simple interfaces, and can be easily read and written;

The first-level register and second-level register are used to sample the input asynchronous reset signal to avoid metastable signals output from the registers due to asynchronous reset signal;

The asynchronous reset signal refers to a reset signal (Reset) input into the FPGA chip at any time without the control of the clock signal, which possibly results in unsatisfactory recovery/removal time of the registers and leads to metastable data output from the registers; when a trigger is in the metastable state, it is possible to predict neither the output level nor the time to output a stable level; meanwhile, the trigger will output some intermediate levels or will be in an oscillatory state, causing an unstable system;

As shown in FIG. 3, according to the embodiment of the invention, the global asynchronous reset signal (Reset) outside the FPGA chip is accessed to a set port of a first-level register (R1) in the I/O module, a constant "0" is input into the first-level register (R1), the output of the first-level register (R1) is input into a second-level register (R2), and then the output of the second-level register (R2) is taken as a sampled global reset signal (Rst1) to reset other registers in the FPGA chip; as there is no fixed sequential relationship between the Reset signal and clock signal (Clock), the Reset signal may fail to meet the required recovery/removal time, and the output port of the first-level register (R1) may be in metastable state, which can be eliminated after a clock cycle in most cases (i.e. the unstable state of the input port of the second-level register (R2) will last for a short time); the second-level register (R2) will output the sampled signal Rst1 synchronizing with the clock signal (Clock) to reset other registers (R3 and R4) in the FPGA chip; thus the asynchronous reset signal (Reset) is sampled by the first-level register and the second-level register, and the sampled signal Rst1 synchronizing with the clock signal (Clock) is output to prevent the metastable output of register due to the global asynchronous reset signal.

The invention claimed is:

1. An FPGA-based interface signal remapping method, characterized by:
   dividing an internal programmable logic of an FPGA chip into two independent modules, with one module being an I/O module and the other module being a Core module, using the I/O module to process signal excursion occurring when an external signal is input to or output from the FPGA chip, signal collision caused by line multiplexing, metastable state in a data transmission process, and a data transmission error between asynchronous clock domains; using the Core module to implement logical processing and computing; and introducing a master clock signal outside the FPGA chip into the FPGA chip through a global clock pin of the FPGA chip;
   wherein, the I/O module comprises a tri-state gate circuit and asynchronous FIFOs;
   the Core module transmits two-way data signals with peripheral components by using the tri-state gate circuit of the I/O module; and
   data signals from the asynchronous clock domains outside the FPGA chip are cached in the asynchronous FIFOs through the I/O module and then input into the Core module.

2. The FPGA-based interface signal remapping method of claim 1, characterized in that the I/O module comprises a first-level register and a second-level register; and
   a global asynchronous reset signal outside the FPGA chip is accessed to a set port of the first-level register in the I/O module, a constant "0" is input into the first-level register, the output of the first-level register is input into the second-level register, and then the output of the second-level register is taken as a sampled global reset signal to reset other registers in the FPGA chip.

* * * * *